(12) United States Patent
Gifford et al.

(10) Patent No.: US 12,011,679 B2
(45) Date of Patent: Jun. 18, 2024

(54) SINGLE LAYER NANOFLUIDIC SEPARATOR CHIP AND FLUIDIC PROCESSOR

(71) Applicant: International Business Machines Corporation, Armonk, NY (US)

(72) Inventors: Stacey Gifford, Yorktown Heights, NY (US); Sung-Cheol Kim, Yorktown Heights, NY (US); Joshua Smith, Yorktown Heights, NY (US); Benjamin Wunsch, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 15/815,846

(22) Filed: Nov. 17, 2017

(65) Prior Publication Data

US 2019/0151774 A1    May 23, 2019

(51) Int. Cl.
*B01D 17/02* (2006.01)
*B01D 21/00* (2006.01)
(Continued)

(52) U.S. Cl.
CPC ......... *B01D 17/02* (2013.01); *B01D 21/0087* (2013.01); *B01D 21/2444* (2013.01);
(Continued)

(58) Field of Classification Search
CPC ....... B01L 3/502753; B01L 2200/0652; B01L 3/5027; B01L 2200/025; B01L 2200/027; B01L 2200/0684; B01L 2200/12; B01L 2300/0609; B01L 2300/0816; B01L 2300/0864; B01L 2300/0896; B01L 2300/12; B01L 2400/0406; B01L 2400/0487; B01L 2400/06; B01L 2400/0622; B01L 3/502707; B01L 3/502715; B01L 3/502723; B01L 3/502776; B01L 2300/0887; B01L 2400/086; B01L 3/502761; B01L 2300/0681; B01D 17/02;
(Continued)

(56) References Cited

U.S. PATENT DOCUMENTS

| 5,096,582 A * | 3/1992 | Lombardi ............ B01D 63/084 |
| | | 210/321.6 |
| 6,929,750 B2 * | 8/2005 | Laurell ............... A61M 1/3472 |
| | | 204/158.2 |

(Continued)

OTHER PUBLICATIONS

Huang et al., Continuous Particle Separation Through Deterministic Lateral Displacement, May 2004, Science, vol. 304. pp. 987-990 (Year: 2004).*

(Continued)

*Primary Examiner* — Patrick Orme
(74) *Attorney, Agent, or Firm* — Yuanmin Cai

(57) ABSTRACT

A fluidic processor device and a wafer including the same, the device including a nanofluidic separator chip including a nanoDLD array, a housing for housing the chip including a top plate disposed on a topside of the chip, a bottom plate disposed on a backside of the chip and fastened to the top plate, and a spacer disposed between the chip and the bottom plate to create a clearance between the chip and the bottom plate for forming a drain space on the backside of the chip.

15 Claims, 11 Drawing Sheets

(51) Int. Cl.
  *B01D 21/24* (2006.01)
  *B03B 5/00* (2006.01)
  *B82Y 99/00* (2011.01)
  *G01N 30/00* (2006.01)
  *G01N 30/60* (2006.01)

(52) U.S. Cl.
  CPC ............ *B03B 5/00* (2013.01); *G01N 30/0005* (2013.01); *B82Y 99/00* (2013.01); *G01N 30/6095* (2013.01)

(58) Field of Classification Search
  CPC ............ B01D 21/0087; B01D 21/2444; B82Y 99/00; B03B 5/00; G01N 30/0005; G01N 30/6095; G01N 33/48721
  See application file for complete search history.

(56) References Cited

U.S. PATENT DOCUMENTS

| | | | | |
|---|---|---|---|---|
| 8,557,097 | B2* | 10/2013 | Afzali-Ardakani | B82Y 30/00 204/600 |
| 8,764,968 | B2* | 7/2014 | Afzali-Ardakani | G01N 33/48721 205/792 |
| 9,700,891 | B2* | 7/2017 | Smith | B01L 3/502746 |
| 10,029,915 | B2* | 7/2018 | Afzali-Ardakani | B82Y 15/00 |
| 10,058,861 | B2* | 8/2018 | Pereira | B01L 3/502723 |
| 10,226,767 | B2* | 3/2019 | Pereira | B01L 3/502723 |
| 10,391,486 | B2 | 8/2019 | Pereira | |
| 10,702,866 | B2 | 7/2020 | Smith | |
| 2008/0023399 | A1* | 1/2008 | Inglis | G01N 33/54366 210/649 |
| 2008/0260542 | A1* | 10/2008 | Nishikawa | B01L 3/565 417/48 |
| 2009/0120865 | A1* | 5/2009 | Chung | B01L 3/502753 210/232 |
| 2011/0168562 | A1* | 7/2011 | Nuckolls | C12Q 1/6869 204/600 |
| 2011/0296903 | A1* | 12/2011 | Cao | B81C 1/00119 73/64.56 |
| 2012/0037544 | A1* | 2/2012 | Lane | B01L 3/502753 209/17 |
| 2013/0217022 | A1* | 8/2013 | Cao | G01N 1/34 435/6.12 |
| 2015/0265994 | A1* | 9/2015 | Hyde | G01N 33/48721 506/6 |
| 2016/0320389 | A1* | 11/2016 | Astier | G01N 33/56983 |
| 2017/0059514 | A1* | 3/2017 | Hoffman | G01N 33/5438 |
| 2017/0120247 | A1* | 5/2017 | Pereira | B01L 3/502715 |
| 2017/0209864 | A1* | 7/2017 | Grisham | B01L 3/502753 |
| 2018/0038876 | A1* | 2/2018 | Arai | B01J 19/0093 |

OTHER PUBLICATIONS

Wunsch et al., Nanoscale lateral displacement arrays for the separation of exosomes and colloids down to 20 nm, Aug. 2016, Nature Nanotechnology, vol. 11, pp. 936-942 (Year: 2016).*

Barker, "IBM's 'lab-on-a-chip' is the latest weapon in the fight against disease," Aug. 3, 2016, accessed on the Internet at https://www.zdnet.com/article/ibms-lab-on-a-chipis-the-latest-weapon-in-the-fight-against-disease/ on Feb. 16, 2021. (Year: 2016).*

Wunsch et al., "Nanoscale lateral displacement arrays for the separation of exosomes and colloids down to 20 nm," Nature Nanotechnology, 11 (2016) 936-940, pub. online Aug. 1, 2016, accessed on the Internet at https://www.nature.com/articles/nnano.2016.134 on Feb. 16, 2021. (Year: 2016).*

Huang et al., "Continuous Particle Separation Through Deterministic Lateral Displacement," Science 304 (2004) 987-990. (Year: 2004).*

Inglis et al., "Critical particle size for fractionation by deterministic lateral displacement," Lab Chip 6 (2006) 655-658. (Year: 2006).*

C.R. King, Jr. et al., "3D Stacking of Chips with Electrical and Microfluidic I/O Interconnects," IEEE, Electronic Components and Technology Conference, 2008, pp. 1-7. (Year: 2008).*

IBM Blog, "Accelerating early disease detection with nanobiotechnology," Aug. 1, 2016, accessed on the Internet at https://www.ibm.com/blogs/research/2016/08/accelerating-early-disease-detection-nanobiotechnology/ on Feb. 16, 2021. (Year: 2016).*

Smith et al., "Integrated nanoscale deterministic lateral displacement arrays for separation of extracellular vesicles from clinically-relevant volumes of biological samples," Lab Chip 18 (2018) 3913-3925. (Year: 2018).*

* cited by examiner

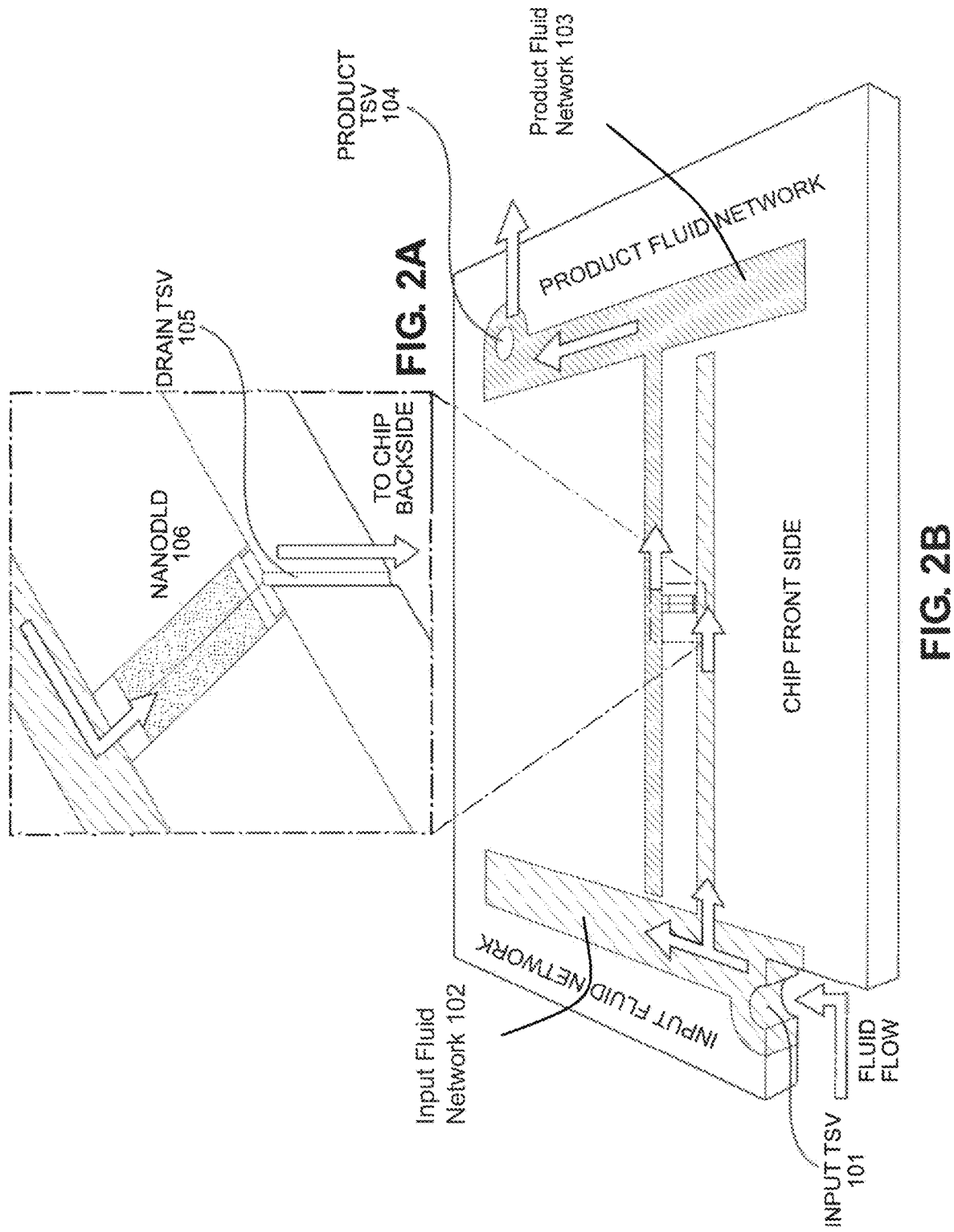

SINGLE LAYER NANOFLUIDIC SEPARATOR CHIP AND FLUIDIC PROCESSOR

BACKGROUND

The present invention relates generally to a fluidic processor, and more particularly, but not by way of limitation, to a high throughput colloid separation on single layer nanofluidic chip that allows massive, parallel-processing of a sample fluid using nanoscale deterministic lateral displacement arrays (nanoDLDs) to effect enrichment or separation of a sample.

Conventionally, high throughput volume processing with nanofluidic structures is a nascent capability with possible wide-range applications in ultrafiltration, medicine, nanotechnology and biotechnology. To process a large volume with structures that can only handle nanoliters of throughput per min requires massive parallelization and simultaneous processing of fluid by hundreds to millions of devices. This conventionally requires a structure to distribute fluid to and from the arrays.

The conventional designs have required multiple layers or stacks of chips (e.g. silicon wafers or glass/silicon wafers) to solve a basic geometric constrain of plumbing three or more distributed fluid networks. Other conventional designs have addressed these multilayer approaches, but these conventional designs have challenges in implementation due to the need to bond several layers and to address the formation of defects at each layer.

SUMMARY

Thus, the inventors have identified a problem in the art and the device described herein improves upon the conventional devices by at least reducing the complexity down to a single chip which is easy to interface to with a micro/macroscale enclosure.

In an exemplary embodiment, the present invention can provide a fluidic processor device and a wafer including the same, the device including a nanofluidic separator chip including a nanoDLD array, a housing for housing the chip including a top plate disposed on a topside of the chip, a bottom plate disposed on a backside of the chip and fastened to the top plate, and a spacer disposed between the chip and the bottom plate to create a clearance between the chip and the bottom plate for forming a drain space on the backside of the chip.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIGS. 2A-2B exemplarily show a single layer nanofluidic separator chip flow path according to an embodiment of the present invention;

DETAILED DESCRIPTION

Figures 1A, 1B, 1C, 1D, 1E:
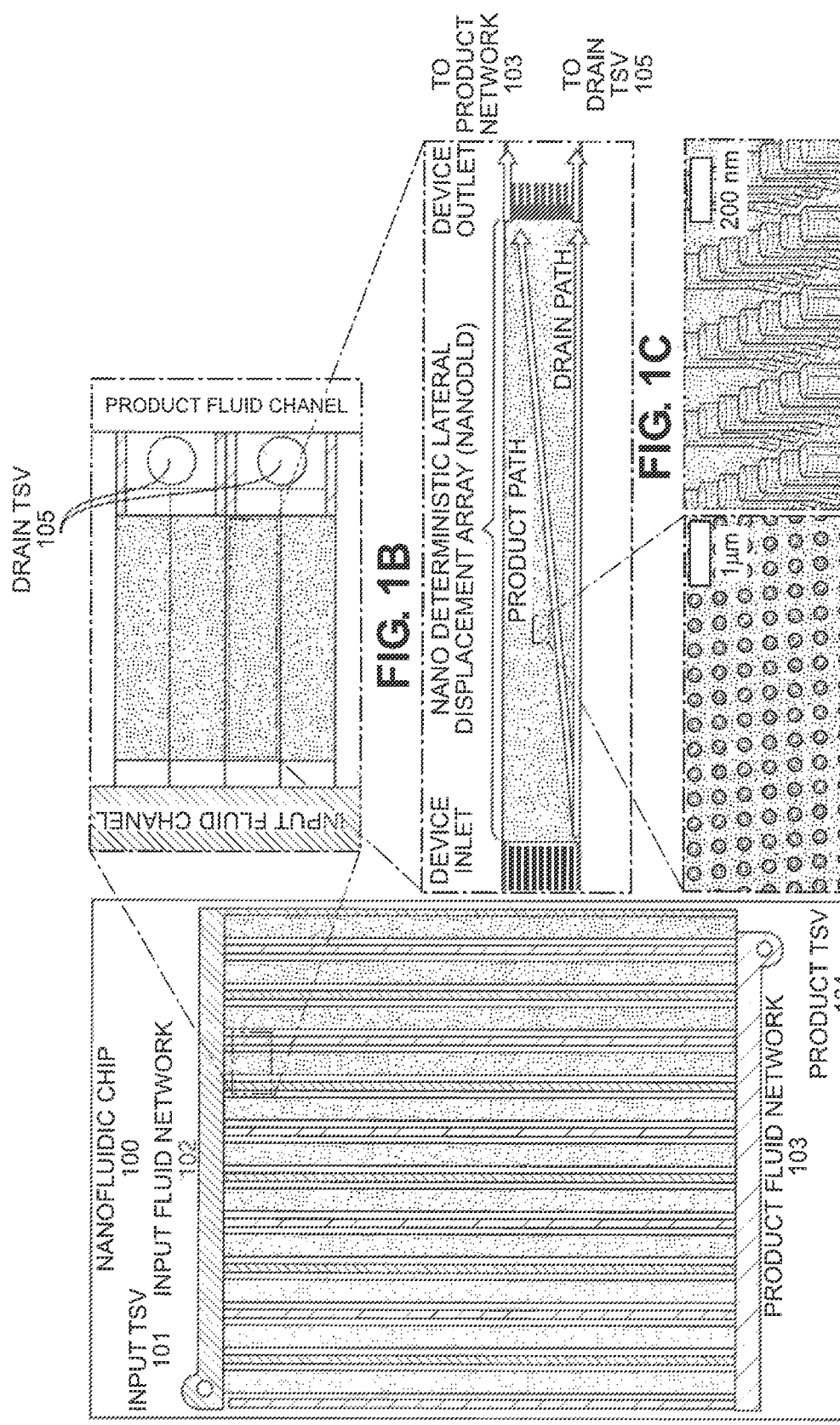
FIGS. 1A-FIG. 1E exemplarily depict an overview of a single layer nanofluidic separator chip 100 according to an embodiment of the present invention.

The invention will now be described with reference to FIGS. 1A-11, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction, FIGS. 1-11 exemplarily depict a nanofluidic structure which is fabricated into a single chip layer and can allow high-throughput processing of fluids for precision, colloidal separation. A single sample input fluid is split into several bussing channels which distribute the fluid to batteries of nanoDLD arrays which process the sample fluid, separating out colloids based on size/shape/mechanical properties, in parallel. The two resultant fluid streams: the product stream 103 and waste stream 105, are recombined into a single output. This is achieved by recollecting product fluid on the same size of the input layer, while dumping waste fluid down through "drain" through-surface-vias (TSVs) 105 onto the backside of the chip, thus solving the geometric constrain of recombining two sets of fluid channels.

The single layer design can be scaled by increasing the distribution of bussing networks, or printing arrays of individual networks, allowing flexibility in scaling and design.

The structure depicted in FIGS. 1-11 can result in a reduction of complexity with plumbing input and output streams by using both the front and backside of the chip to isolate fluid. This requires a housing structure to enclose the processing chip, the housing structure containing the waste fluid and isolating it from the product fluid in order to prevent cross-contamination.

Referring generally to FIGS. 1-4, the fluidic processor, includes a network of micro- and nanofluidic structures fabricated into a layer of material (from here on considered to be a silicon wafer), including a nanofluidic chip 100, and a housing (180/190) (i.e., a flow cell or a cell) enclosure for protecting the chip, interfacing fluidic connections, and, acting as a secondary chamber to collect and isolate waste from the collected product.

FIGS. 1A-1E depict the nanofluidic chip according to one embodiment of the invention. As shown, FIG. 1A depicts the overview of an embodiment for a single-layer fluidic processor, consisting of a network of fluidic channels which distribute/recollect sample fluid to/from batteries of nanoscale separator devices. An Input TSV 101 allows sample fluid to be injected into the input fluid network 102 which transfers and distributes fluid to the batteries of arrays. FIG. 1B shows a close-up view of a section from one of the array batteries, showing the connection between the input fluid channel, through the nanoscale separator device, to the product fluid channel 103 and drain TSVs 105. FIG. 1B shows the essential partitioning of fluid to the two separate fluidic networks: the product fluid channel 103 and the drain TSV 105. In the depicted embodiment, the nanoscale separator device is a nanoscale deterministic displacement array (nanoDLD) which sorts particles into laterally (perpendicular to flow) separated streams based on size/morphology/mechanical properties. This lateral sorting necessitates splitting the fluid stream into two channels across the lateral dimension, hence the placement of the drain TSV 105 and the small feed-through channel to the product fluid channel. FIG. 1C shows a close-up view of a single nanoDLD device, showing the sequentially layout of the DLD architecture with an inlet section, the displacement array, and the outlet section. For this particular embodiment, sorted particles are moved upward along an angle shown as an arrow in FIG. 1C. These sorted particles are fed to the product fluid channel seen in FIG. 1B. Unsorted particles flow through and into the drain TSV. The displacement array is composed of a lattice of pillars (or prisms) which are arranged in an asymmetric tilt either through a rotational or translational transformation. FIG. 1D shows an overhead view of an embodiment for a nanoDLD array with cylindrical pillars, and a translational transformation which shifts each consecutive row by a fraction of the pillar diameter, leading to a tilt of the primary pillar axis which gives the sorting angle seen in FIG. 1C. FIG. 1E shows a cross-sectional view of the same nanoDLD embodiment in FIG. 1D, emphasizing the pillar arrangement and the depth of the array. All nanoDLD arrays require some depth to allow fluid flow, and the deeper the array the greater the through-put that can be processed per array.

The nanofluidic chip 100 includes three fluid networks of an input sample 102 injected via the input TSV 101, an output product collected via the product TSV 104 and isolated in a separate chamber, and a drain fluid which flows through the nanoDLD arrays 106 via the drain TSV 105 and is collected and isolated in a separated chamber (i.e., drain space) on a backside of the chip 100 as shown in FIGS. 2A-4. Thus, three fluid connections are required to address these three networks. FIG. 2B shows a schematic mapping of the fluid flow through a single nanoDLD within the larger battery of arrays in the processor. Sample is injected through input TSV 101, which flows through the input fluid network 102. This network consists of a series of branching fluid channels which distribute the fluid to each fluidic device. Fluid is passed through each nanoDLD 105 (one particular embodiment of a nanoscale separator that could be incorporated). Sample is processed in the nanoDLD, and the two outputs (sorted and unsorted particle fluid) are spatially separated laterally. These two streams of fluid are directed into two different fluidic networks as shown in FIG. 2A. Unsorted particle fluid is passed into the drain TSV 105 which pipes the fluid to the backside of the processor chip. Sorted fluid passes through small side channels (not labeled) which connect to the product fluid network 103. The product fluid network consists of a series of branching fluidic channels which collect and convert into a single product TSV 104 through which sorted particle fluid exits the device and is collected. The flow map shown in FIG. 2B is the same overall path for each device in the batteries of nanoDLD arrays.

The input and product output networks 102 are fabricated on a same side of the chip 100. The fabrication is done by using two sets of bussing channels which are interdigitated together. The design is alternating, interdigitated linear bussing channels, although any number of alternative layouts is possible. The input and product buses are configured such that each bus brackets a region in which nanostructure separators (e.g. nanoDLD arrays 106) are fabricated, so as to allow sample fluid to flow from an input bus, through separator, and into a product bus. This distance can be chosen based on the design constraints of the separator, but is preferably on the order of 0.1-5 mm.

Figure 5:
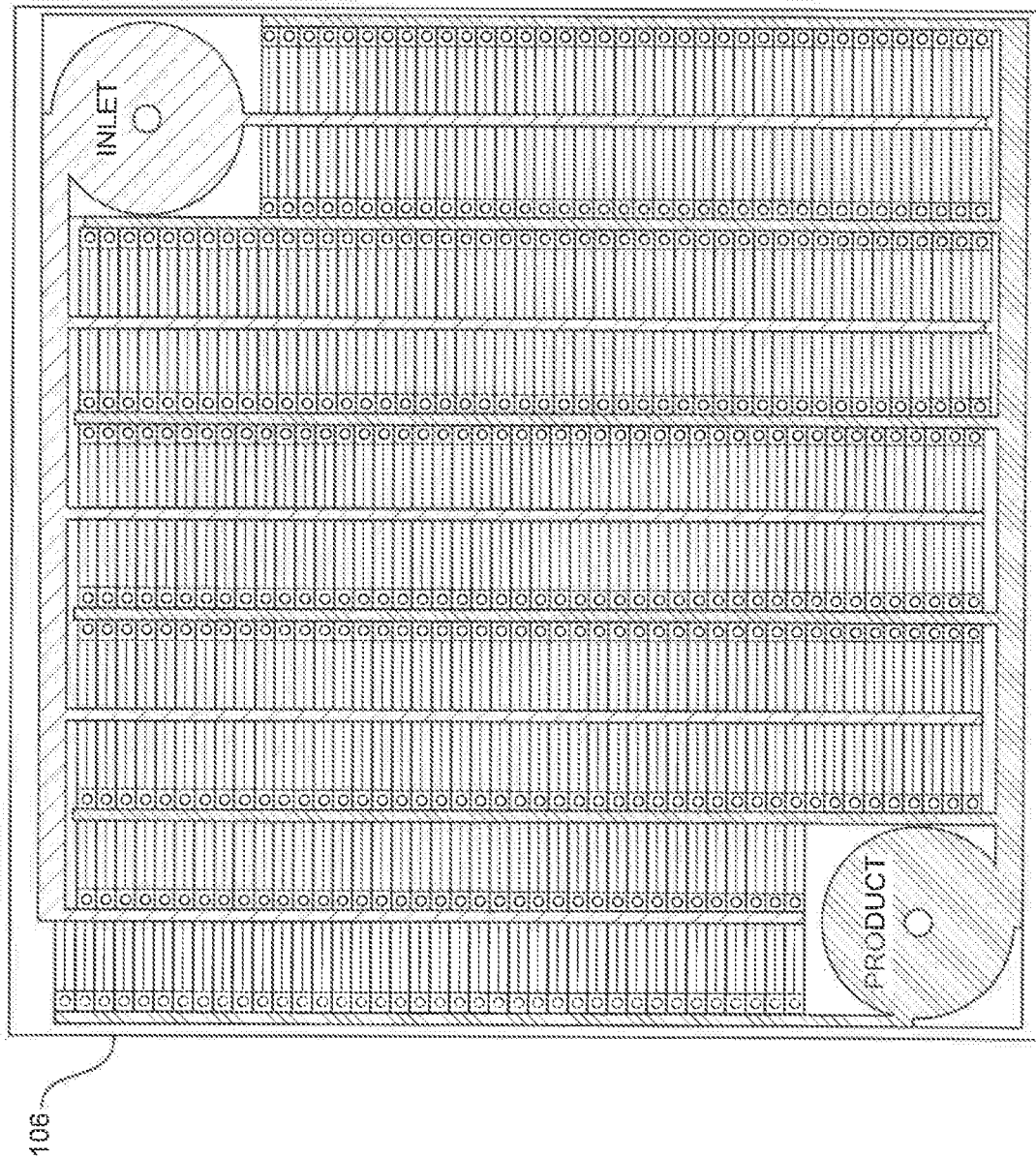
FIG. 5 exemplarily shows a nanoDLD 106 according to an embodiment of the present invention.

For a separation process, nano-colloids following into the separator will be displaced laterally depending on the size of the particle, and other physical properties (e.g., the array depicted in FIG. 5). This separates the input fluid flow into two streams: a displaced stream and an unperturbed stream. The nature of the sample determines which stream is the product and which is the drain (i.e., waste). In either scenario, the separator is designed such that the product stream is branched off into a separate channel or slit which feeds into a product bus channel. The drain stream is shunted to a separate channel or slit which feeds into a through-surface via, TSV, a hole that goes through the thickness of the chip and allows fluid to transfer from the top side of the chip (the device side) to the backside. There is a TSV for each separator (i.e., input TSV 101, product TSV 104, and drain TSV 105), although two separators can feed into a single drain due to geometry.

Figure 10:
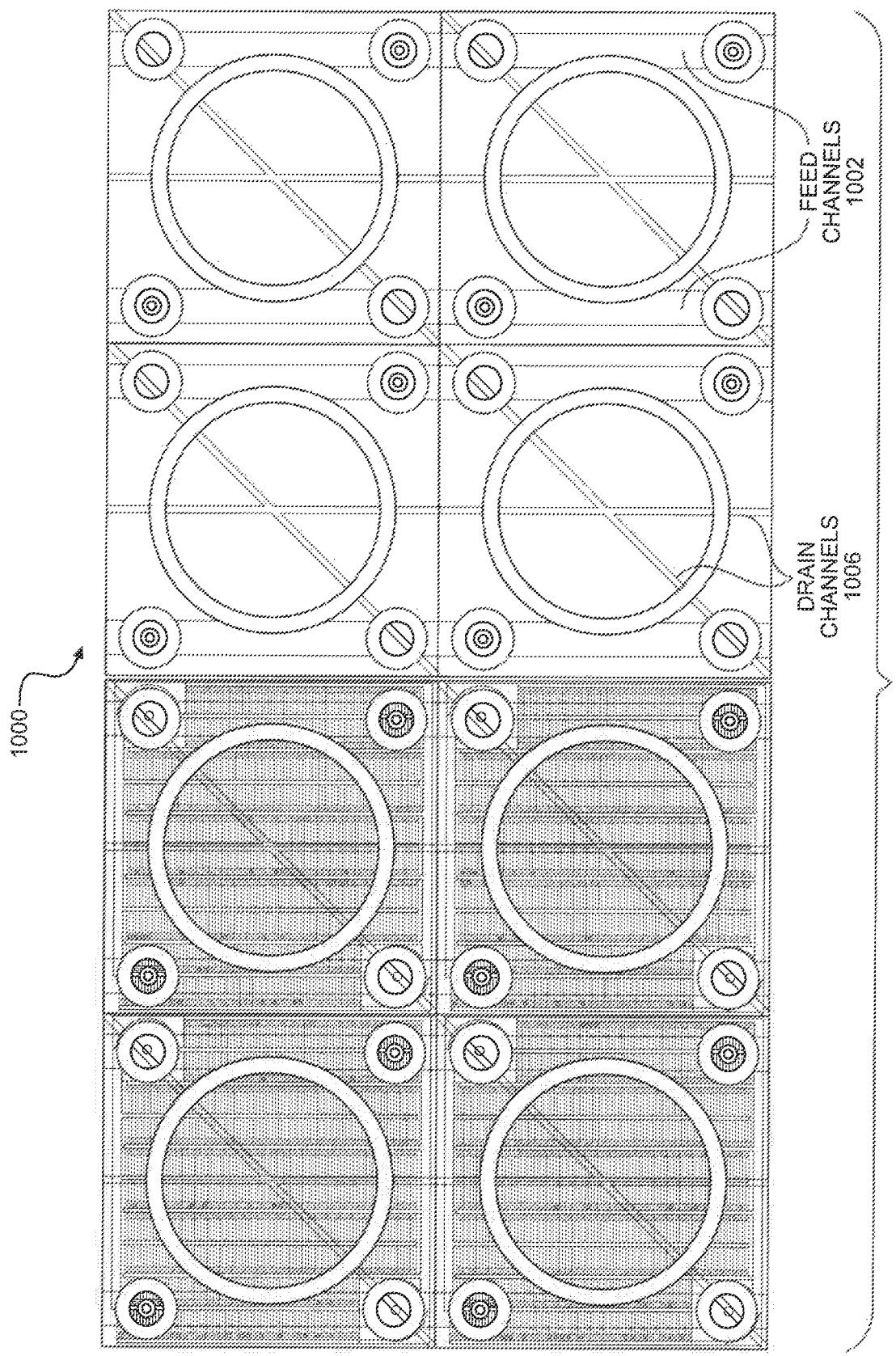
FIG. 10 exemplarily shows clustered module drain channels 1000 according to the second embodiment of the invention.

FIG. 5 exemplarily depicts a 20 mm×20 mm structure which includes the dimensions of: an array: L=1,000 μm, W=100 μm, ε=0.1, Main Buses: W=500 μm, Buses: W=2001 μm, Border: 250-500 μm, and Arrays: ~700. It is noted that the invention is scalable as shown in FIG. 10 depicting a 40 mm×400 mm structure.

Figure 3:
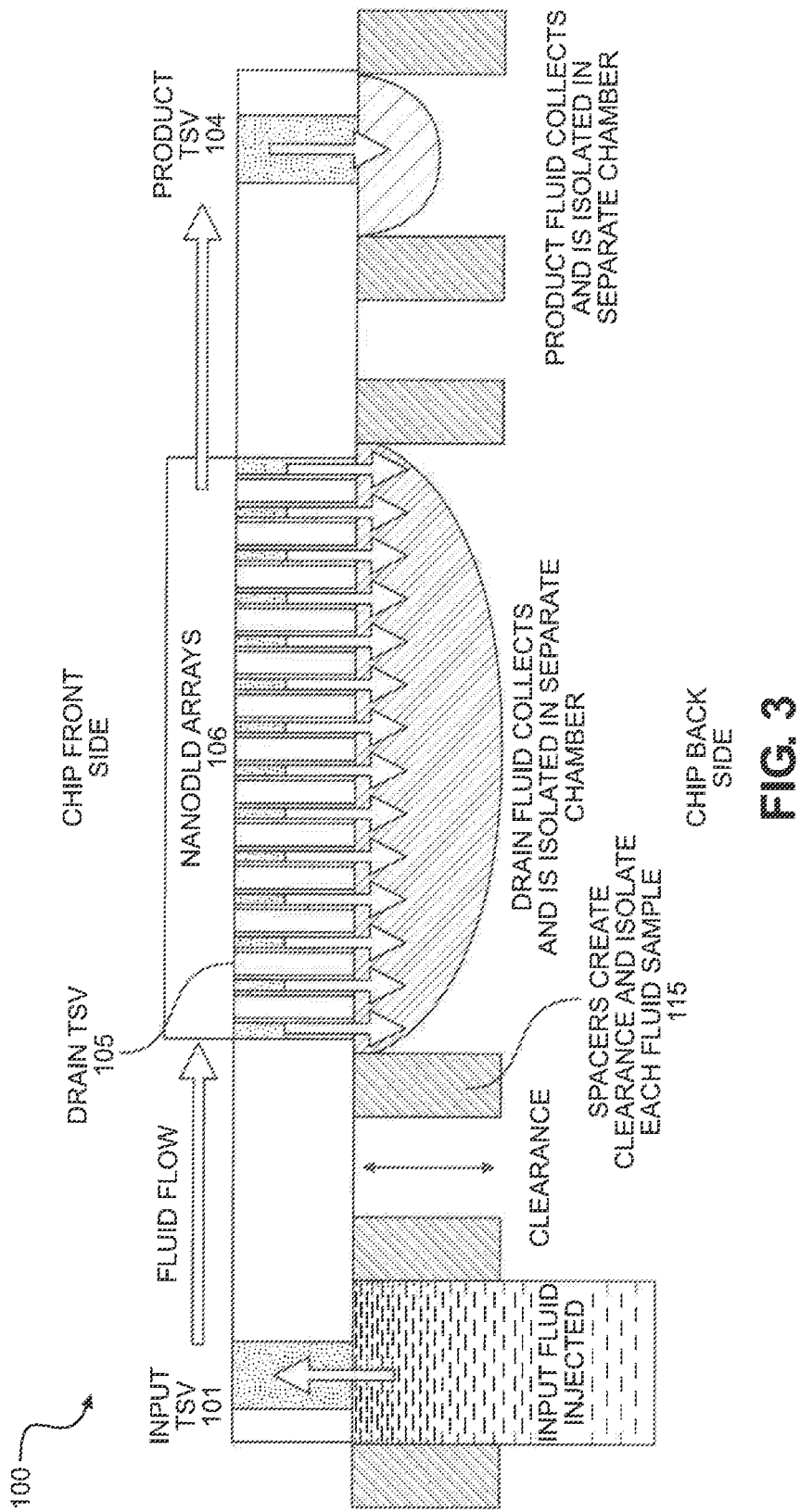
FIG. 3 exemplarily shows a three fluid path schematic of the single layer nanofluidic separator chip 100 according to an embodiment of the present invention.
Figure 7:
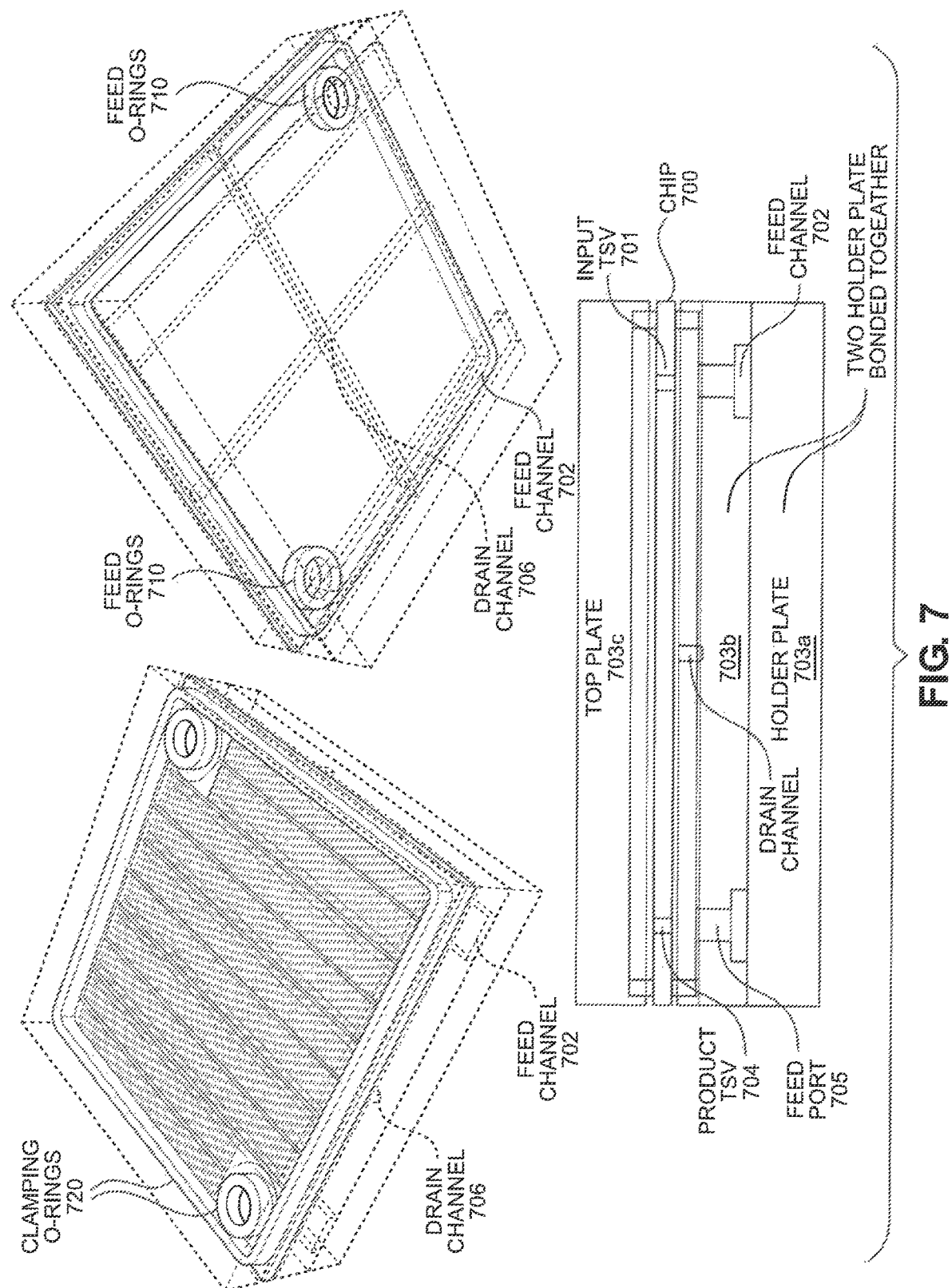
FIG. 7 exemplarily shows a flow cell module 700 according to a first embodiment of the invention.
Figure 9:
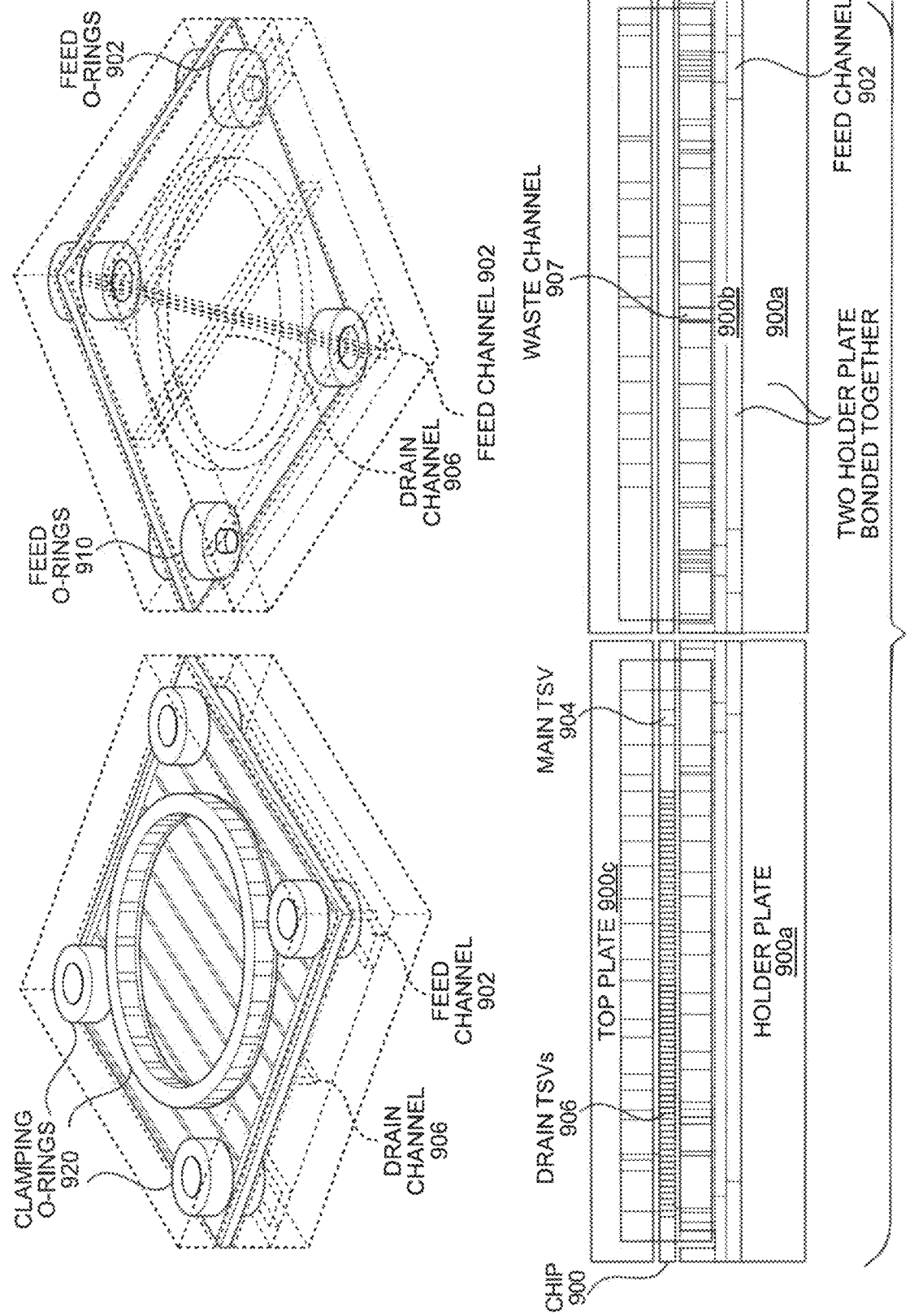
FIG. 9 exemplarily shows a flow cell module 900 according to a second embodiment of the invention.

Drain fluid transmit from the separators into the drains and is then transmitted to the backside of the chip. This fluid is contained by the presence of the housing as shown in FIGS. 3, 7, and 9). The housing includes an enclosure or encasing that holds the chip 100 securely, allowing the chip to be pressurized with fluid, holding any interfacing connections for transmitting sample fluid to and from the chip, and protecting the chip from external damage.

Figure 4:
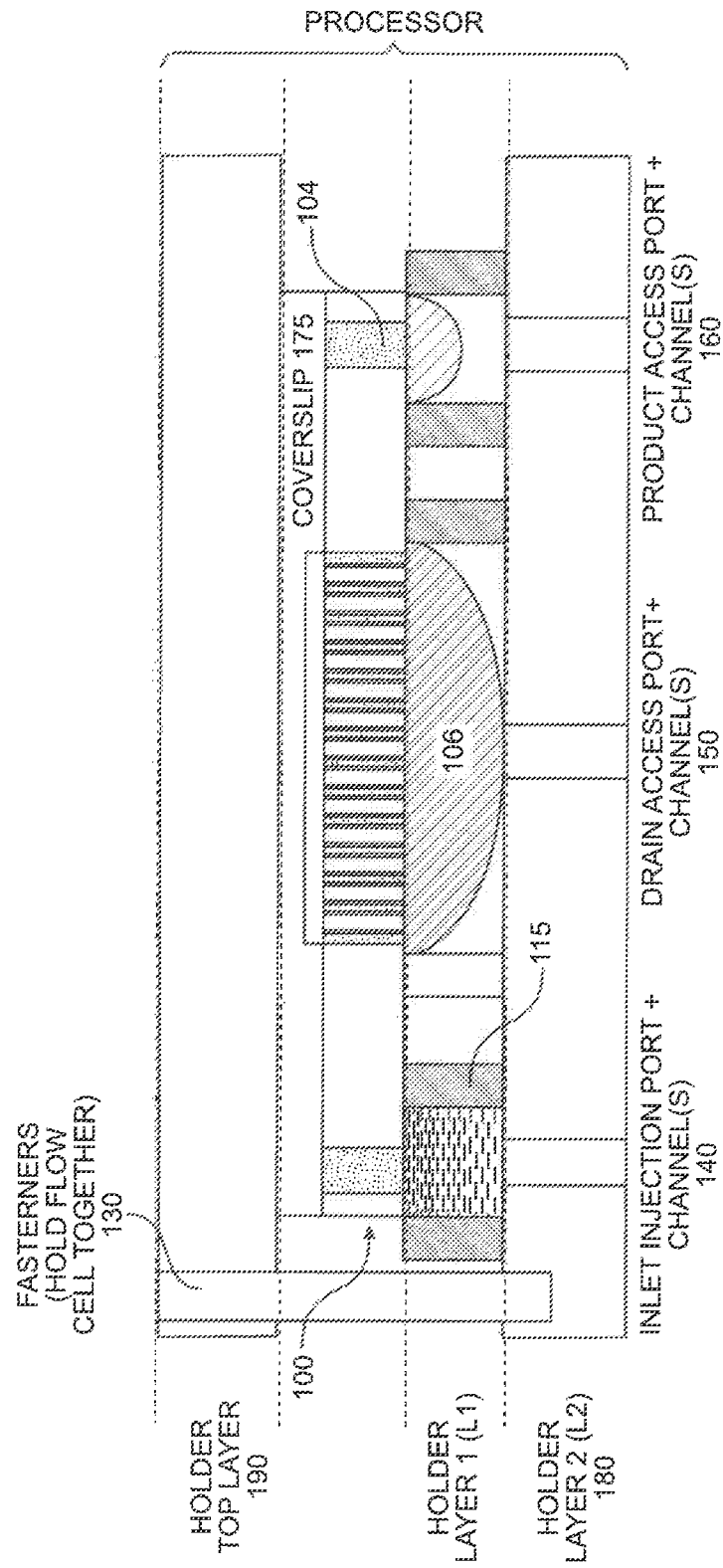
FIG. 4 exemplarily shows a flow cell layout of the single layer nanofluidic separator chip 100 according to an embodiment of the present invention.

The housing includes a pocket, which holds/clamps the chip in place, and the dimensions of the pocket are set such that there is an open space underneath (on the backside) of the chip. That is, a clearance is set by spacers 115 to create the space and isolate each fluid sample). The clearance should generally be 1 μm or greater, with a typical clearance of 1,000-10,000 μm sufficient for processing 100-1000 μL samples. The space forms separate chambers and collects the drain product form the backside of the chip. The drain space is geometrically located over and encompasses all of the TSVs so that the drain fluid is collected. The drain space can be a single open space or any complex design of features, channels, etc. depending on requirements. The formation of the drain space can be made in several ways, but most easily is the use of the spacer 115 as shown in FIGS. 3 and 4 which lofts the chip some distance above the cell pocket floor. That is, the use of drainage TSVs through wafer to distribute one fluid network to the backside of the chip with the spacers 115 to provide for the clearance enables a housing cell with drainage space that is formed from lofting the chip, and in which the output fluid is isolated from any other fluid inputs/outputs.

FIG. 3 exemplarily depicts a cross-sectional view of the chip 100. As shown in FIG. 3, the sample fluid (input fluid) is injected into the processor device through input TSV 101. In this particular depiction, the fluid is introduced through the backside of the device, but frontside or side-edge loading are also possible. Fluid travels through the input fluid network (not shown) into the nanoDLD arrays 106. The two output fluid streams from the nanoDLD divert to different sections of the processor: the unsorted material is passed through the drain TSVs 105 which go through to the backside of the chip, while the sorted material is passed to the product TSV 104 which then channels it to the backside of the chip. For both output fluids, the fluid accumulates and pools in separated chambers on the backside of the chip. The chambers are formed by sets of patterned spacers and the chip housing (not shown). The spacers set the depth of the collection chambers. Collected fluids can then be unloaded from the chip/housing from their respective chambers.

FIG. 4 exemplarily depicts a view of the chip 100 in a housing including a holder top layer 190, a holder layer 1 (L1) and a holder layer 2 (L2) 180. As shown in FIG. 4, a cross-sectional view of a fluidic chip and the holder encasing it. The chip has the same layout as depicted in FIG. 3. The coverslip 175, which forms the ceiling of the fluidic network, is shown—outlining schematically the full processor chip. The holder holds the processor chip and provides the interfacing for fluid injection and retrieval. The holder shown in the embodiment consists of three layers: top layer, layer 1 (L1) and layer 2 (L2). Layer 2 contains macro-to-micro fluidic connectors that allow interfacing of the processor to an external fluidic source (e.g. syringe, pump, capillary etc.). Layer 2 transmits/receives fluids from layer 1 which interfaces directly to the processor chip. The holder's combined L1,L2 provide the interfacing which steps the fluid sample from a macroscale level (e.g. volumes that can be easily manipulated by a user) to the micro/nano scale required for the fluidic chip. Layer 1 also contains a pockets(s) which form the floor of the separation chambers where drain fluid and product fluid are pooled for collection. This pocket can include the spacers necessary for setting the depth of the separation chambers, or the spacers can be fabricated onto the backside of the chip or installed as a separated layer or hardware into the holder pocket or onto the chip. Layer 1 also contains any pockets or features necessary to align and hold the processor chip securely in place. The top layer 190 of the holder provides a clamping surface to hold and compress the processor in place. Fasteners 130 (or other binding hardware or mechanisms) clamp the top and L1,L2 layers together to form a compressive stress on the chip to both hold the chip in place and prevent leaking of fluid. Alternative holding methods can be used (e.g. vacuum, adhesive bonding) in which no top is necessary. The top layer can also include any ports, windows, sensors or additional features for viewing or monitoring the chip during operation. The overall holder provides a protective encasement to prevent the chip from damage or external contamination during operation.

Figure 8:
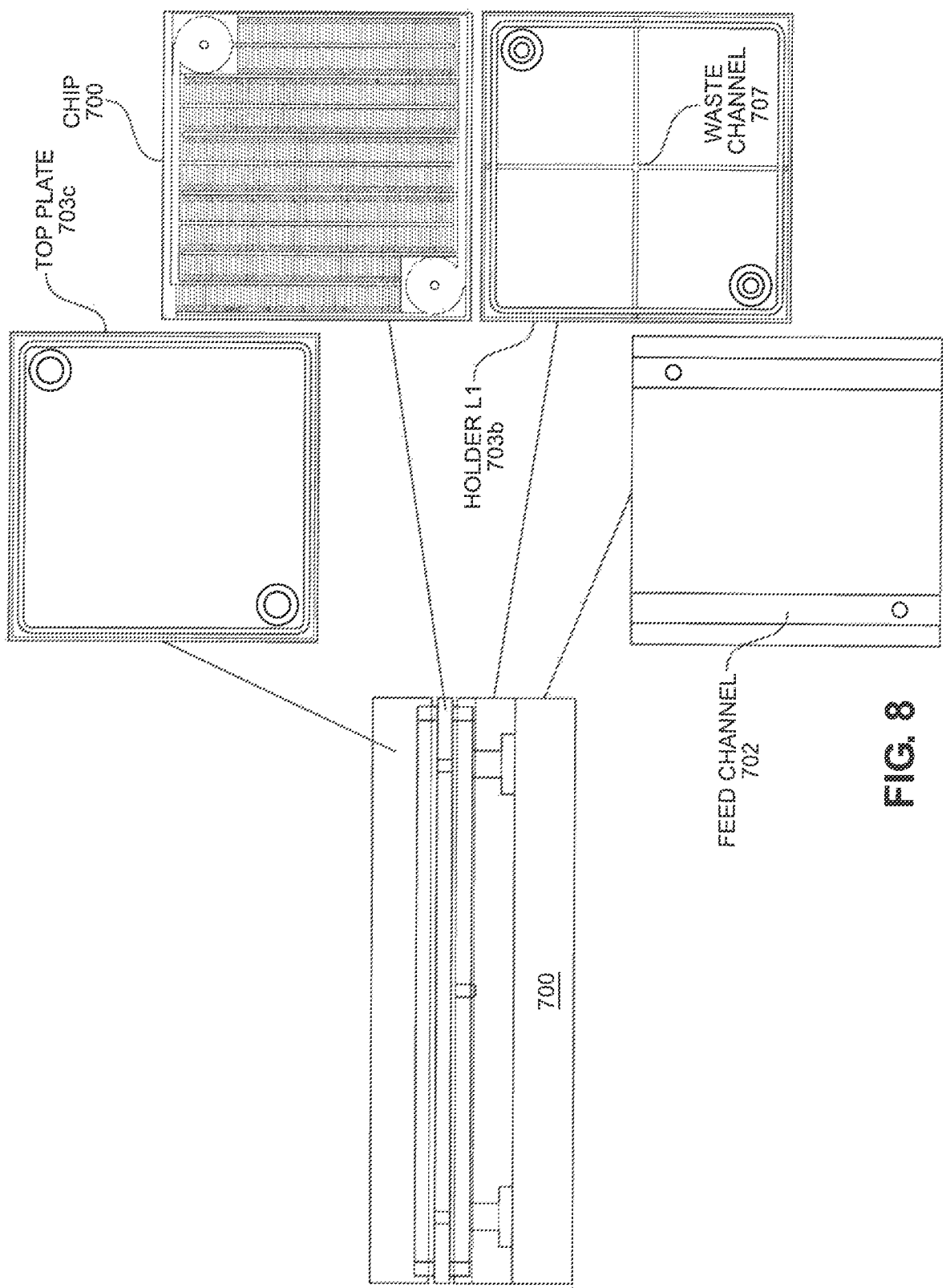
FIG. 8 exemplarily shows the flow cell module 700 according to the first embodiment of the invention.

As shown in FIG. 7, the spacer 115 can be embodied by the use of O-rings (710/720) or elastomeric gaskets to cause a spacing/clearance to form between the housing 703a/703b/703c and chip 100. These O-rings 710/720 can be used to provide a seal (i.e., feed port 705 and feed channel 702) for the input and product flows to the chip 100, as well as isolate the drain space. The use of O-rings can be used to form a "corral" around the drains, to form a single drain space that will isolate all drain fluid. Within any variation, the drain space isolates the output drain fluid emitted from the TSVs (701, 704, 706) on the backside of the chip. Separate ports/connects can be used to interface to the drain space and remove/collect the drain fluid. As shown in FIGS. 7 and 8, the O-rings 710/720 can be arranged at opposite corners of the device.

With reference to FIG. 8, the housing 703a/b/c is depicted. The top plate 703c interfaces with a top side of the chip 700 and includes the clamping O-rings 720. The clamping O-rings 720 can include an outer O-ring which keeps fluid in the device and has a same height as the clearance. In this manner, the larger outer O-ring can help set the clearance since the larger O-ring is easier to manufacture. Holder L1 703b includes the feed O-rings 710 which allows for separate from the chip and the holder 703b. The holder L1 703b is bonded to the holder plate 703a which includes the feed channel 702. The feed O-rings of the holder L1 703b interface with the feed channels and include a feed port 705 and feed channel 702. The chip 700 includes the input TSV 701 and the product TSV 704 that interface with the feed port 705 and the feed channel 702. The drain channel 706 is formed in the clearance between the holder 703b and the chip 700. The drain channel 706 acts as a canal through which the drain fluid can flow and is described into holder L1 703b. The housing acts as a "collection layer" for the zigzag fluid, the space between the chip backside and the housing, due to the O-ring's sitting proud of the surface, acts as collection layer, and channels etched into floor of holder plate to transmit zigzag fluid between chips (to avoid overflow) are used. It is noted that the O-rings and feed rings are symmetrical.

In a second embodiment as depicted in FIGS. 9 and 10, the O-rings 910/920 can be arranged at each corner of the device. Also, a clamping O-ring 920 can be provided around the center of the device on a top side of the device. The embodiment shown in FIGS. 9 and 10 is an exemplary configuration for an array of fluidic processors 100 as shown in FIG. 10. The clamping O-ring 920 allows for the drain fluid to be drained via the drain TSVs 906 into the center drain channel arranged through the center of the device from a width side to width side whereas the drain channels 1006 from corner to corner are utilized via the TSVs located in the O-rings. Further, and similar to the first embodiment of FIGS. 7 and 8, the O-rings are configured to separate the chip from the top plate 900c and the holder plates 900a/b (i.e., a clearance is provided between the chip and the backside of the chip for the drain fluid).

With reference to FIG. 9, the chip 900 is housed between two holder plates bonded together 900a/b and the top plate 900c. The feed O-rings 910 create a clearance between the backside of the chip and the housing 900a/b. The chip includes drain TSVs corresponding to the clamping O-ring in surround the center of the chip. The drain channel 906/907 collect the drain via the drain TSV's.

Figure 6:
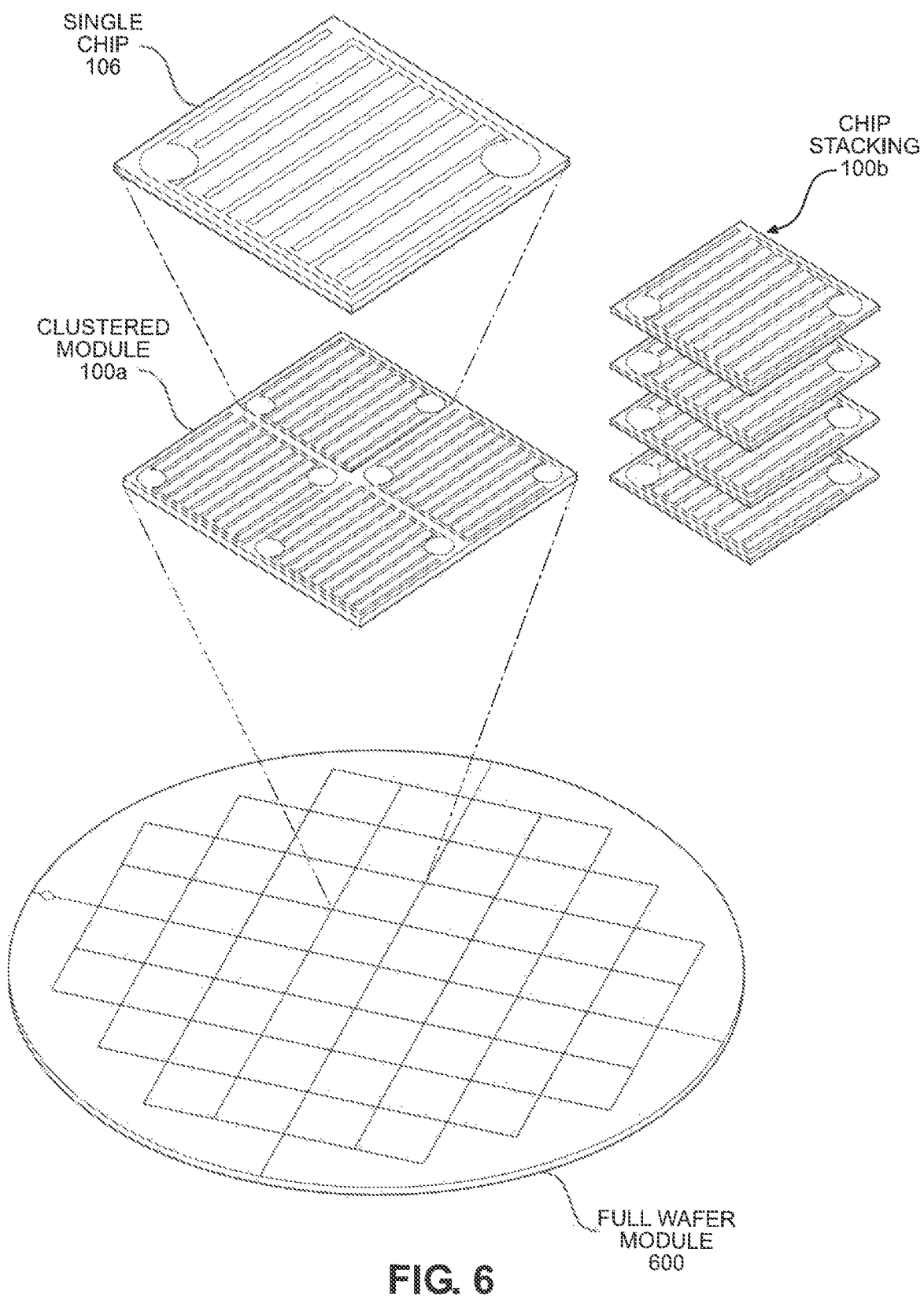
FIG. 6 exemplarily shows implementations of the chip design 106 in modules 600.

With reference to FIG. 6, FIG. 6 exemplarily depicts multiple ways of implementing the invention chip design in modules. As shown, the chip can be stacked (i.e., chip stacking 100*b*), the chip can be provided as a single chip 106, or as an alternative, the chip can be provided as a clustered module 100*a* each of which are installed on the full wafer module 600.

Figure 11:
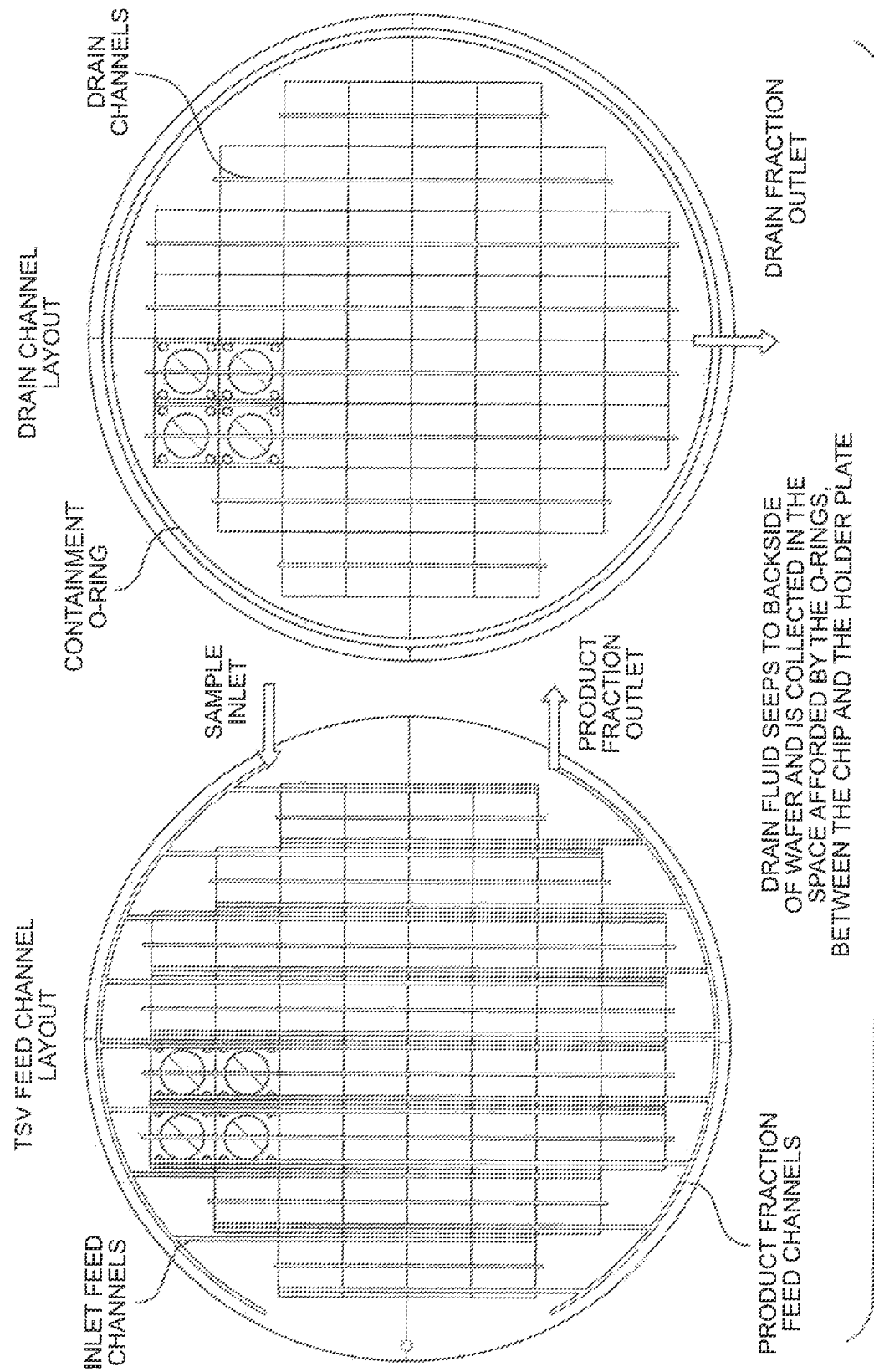
FIG. 11 exemplary shows a holder plate according to an embodiment of the invention.

FIG. 11 exemplary depicts a TSV feed channel layout and a drain channel layout for a cell on a full wafer module. The drain fluid seeps to backside of the wafer and is collected in the space afforded by the O-rings (or spacers 115) between the chip 100 and the holder plates 700*a/b* and 900*a/b*. As shown in FIG. 11, the clustered module drain channels of FIG. 10 are shown on the holder plates.

The embodiments described above can provide for advantages including a single chip layer which reduces processing costs and technical complexity, a readily scalable by mass-printing single layer design, a parallel processing of clinical and research relevant levels of fluid (i.e. mL's) using precise, well-defined engineered separation media (i.e. nanoDLD), and a device amenable to economical and mass-manufactural material platforms, e.g. silicon nanofabrication and polymer imprint nanolithography.

For example, in one embodiment of the invention, the invention can be used for enabling processing of sample volumes in the ≥1 mL within 60 min or less, to allow preparation of purified colloids using a higher precision nanoscale technique. The invention is applicable to all areas of molecular biology and biochemistry. For example, the invention can provide for the purification of exosomes (and other extracellular vesicles) from biological fluids, for the separation of nucleic acids, such as DNA and RNA, based on molecular weight—for applications in base sequencing, library preparation, genetic engineering and synthetic biology, and for the separation of biomolecule conjugates, such as antibody-capture beads or surface modified nanocrystals, for concentration and purification of rare samples from a complex biological mixture (e.g. minute disease proteins from blood). The ability to process colloidal samples at higher volumes (e.g. 1 mL) in reasonable times (e.g. 60 min or less) has wider applicable in material science, chemistry and agriculture for the rapid isolation of colloids ranging from synthetic crystals, polymer beads, pigments, and spores.

The ability to rapid process larger volumes is also applicable to diagnostics, especially in cases were a rare analytic is desired. In these cases, the invention can allow processing of 1-8 mL (e.g. a typical blood sample) within a day to allow separation and detection of small quantities of DNA, vesicles or protein aggregates.

In all cases, the invention advances the field of colloidal (bio-colloidal) separation by allowing a more precisely defined and engineered nanostructured medium to be used for sample preparation, something which is atypical for current lab-on-a-chip technologies, opening the ability to separate samples that have hereto been difficult to separate reliably or cheaply, e.g. extracellular vesicles, which require currently high energy/high processing time/high technical skill ultracentrifuge to purify.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A fluidic processor device including an input through-surface-via (TSV), a product TSV, a drain TSV, two sets of bussing channels, an inlet injection port channel, a product access port channel, a drain access port channel and a fastener, the fluidic processor device comprising:
   a nanofluidic separator chip including a nanofluidic deterministic lateral displacement (nanoDLD) array;
   a housing, for housing the nanofluidic separator chip, including:
      a top plate disposed on a top side of the nanofluidic separator chip;
      a bottom plate disposed on a back side of the nanofluidic separator chip; and
      a first spacer and a second spacer disposed between the nanofluidic separator chip and the bottom plate;
   a first chamber that stores a drain fluid which flows through the nanoDLD array via the drain TSV and that is:
      geometrically aligned about a center axis of the first chamber with the drain TSV and the nanoDLD array; and
      located between inner edges of the first spacer; and
   a second chamber that stores an output product which flows through the product TSV and that is:
      geometrically aligned about a center axis of the second chamber with the product TSV; and
      positioned between inner edges of the second spacer.

2. The fluidic processor device of claim 1, wherein the first spacer includes an O-ring, and
   wherein the second spacer includes an O-ring.

3. The fluidic processor device of claim 2, wherein an inner diameter of the O-ring of the second spacer corresponds to the inner edges of the second spacer.

4. The fluidic processor device of claim 1, wherein the housing further includes:
   a third spacer geometrically aligned about a center axis with the input TSV,
   wherein a sample fluid is injected through the third spacer into the input TSV.

5. The fluidic processor device of claim 4, wherein the first spacer, the second spacer, and the third spacer are separated from each other in a fluid flow direction.

6. The fluidic processor device of claim 1, wherein the first spacer and the second spacer are separated from each other in a fluid flow direction.

7. The fluidic processor device of claim 1, wherein the first chamber is sandwiched between the nanoDLD array, the bottom plate, and the first spacer, and
   wherein the second chamber is sandwiched between the product TSV, the bottom plate, and the second spacer.

8. The fluidic processor device of claim 1, wherein inner edges of the second spacer are spaced such that a distance between a first edge and a second edge of the inner edges is larger than a diameter of the product TSV.

9. The fluidic processor device of claim 1, wherein both a front side and the back side of the nanofluidic separator chip isolate fluid.

10. The fluidic processor device of claim 1, wherein the first chamber and the second chamber are simultaneously connected to the back side of the nanofluidic separator chip, and
wherein the first chamber and the second chamber are disposed between the nanoDLD and the bottom plate.

11. The fluidic processor device of claim 1, wherein the nanofluidic separator chip includes the two sets of bussing channels which are interdigitated together, and
wherein each bus of the two sets of bussing channels brackets a region in which the nanoDLD array is fabricated so as to allow a fluid to flow from an input bus, through a plurality of separators, and into a product bus.

12. The fluidic processor device of claim 1, wherein the first chamber isolates the drain fluid emitted from the nanoDLD array on the back side of the nanofluidic separator chip.

13. A fluidic processor device including an input through-surface-via (TSV), a product TSV, a drain TSV, two sets of bussing channels, an inlet injection port channel, a product access port channel, a drain access port channel and a fastener, the fluidic processor device comprising:
a single layer chip for mass-parallel processing of a sample fluid;
a housing, for housing the single layer chip, including:
a top plate disposed on a top side of the single layer chip;
a bottom plate disposed on a back side of the single layer chip; and
a first spacer and a second spacer disposed between the single layer chip and the bottom plate;
a first chamber that stores a drain fluid which flows through the single layer chip via the drain TSV and that is:
geometrically aligned about a center axis of the first chamber with the drain TSV and the single layer chip; and
located between inner edges of the first spacer; and
a second chamber that stores an output product which flows through the product TSV and that is:
geometrically aligned about a center axis of the second chamber with the product TSV; and
positioned between inner edges of the second spacer.

14. The fluidic processor device of claim 13, wherein the single layer chip uses interdigitated bus channel networks to link together several separator nanostructures in parallel.

15. A wafer, the wafer comprising:
a fluidic processor device including an input through-surface-via (TSV), a product TSV, a drain TSV, two sets of bussing channels, an inlet injection port channel, a product access port channel, a drain access port channel and a fastener, the fluidic processor device including:
a nanofluidic separator chip including a nanofluidic deterministic lateral displacement (nanoDLD) array;
a housing, for housing the nanofluidic separator chip, including:
a top plate disposed on a top side of the nanofluidic separator chip;
a bottom plate disposed on a back side of the nanofluidic separator chip; and
a first spacer and a second spacer disposed between the nanofluidic separator chip and the bottom plate;
a first chamber that stores a drain fluid which flows through the nanoDLD array via the drain TSV and that is:
geometrically aligned about a center axis of the first chamber with the drain TSV and the nanoDLD array; and
located between inner edges of the first spacer; and
a second chamber that stores an output product which flows through the product TSV and that is:
geometrically aligned about a center axis of the second chamber with the product TSV; and
positioned between inner edges of the second spacer.

* * * * *